United States Patent
Cooper et al.

(10) Patent No.: US 7,515,699 B2
(45) Date of Patent: Apr. 7, 2009

(54) CALL HANDLING USING NON-SPEECH CUES VIA A PERSONAL ASSISTANT

(75) Inventors: Robert S. Cooper, Columbia, SC (US); Jason Hucks, Columbia, SC (US); Derek Sanders, Columbia, SC (US); Jeff McElroy, Columbia, SC (US); Jeeth Garageshwara, Columbia, SC (US); Richard Ulmer, Columbia, SC (US)

(73) Assignee: Avaya Inc., Basking Ridge, NJ (US)

( * ) Notice: Subject to any disclaimer, the term of this patent is extended or adjusted under 35 U.S.C. 154(b) by 996 days.

(21) Appl. No.: 10/413,024

(22) Filed: Apr. 14, 2003

(65) Prior Publication Data

US 2004/0202300 A1    Oct. 14, 2004

(51) Int. Cl.
H04M 3/42 (2006.01)
G08B 5/22 (2006.01)
H04Q 1/30 (2006.01)
H04W 4/00 (2006.01)

(52) U.S. Cl. ............... 379/201.01; 379/201.1; 340/7.21; 455/415; 455/466

(58) Field of Classification Search ............ 379/201.01, 379/211.02, 211.01, 201.1; 455/445, 567, 455/417, 466, 415, 517, 556.2; 340/7.22, 340/7.58, 7.21
See application file for complete search history.

(56) References Cited

U.S. PATENT DOCUMENTS

| | | | | |
|---|---|---|---|---|
| 5,311,570 A | * | 5/1994 | Grimes et al. | 455/417 |
| 5,742,905 A | | 4/1998 | Pepe et al. | |
| 6,032,023 A | * | 2/2000 | Foladare et al. | 340/7.22 |
| 6,067,443 A | * | 5/2000 | Fuller et al. | 340/7.58 |
| 6,385,453 B1 | * | 5/2002 | Foladare et al. | 455/445 |
| 6,453,164 B1 | * | 9/2002 | Fuller et al. | 455/445 |
| 7,231,232 B2 | * | 6/2007 | Osann, Jr. | 455/567 |
| 2002/0085701 A1 | * | 7/2002 | Parsons et al. | 379/211.01 |
| 2003/0153364 A1 | * | 8/2003 | Osann, Jr. | 455/567 |
| 2004/0114747 A1 | * | 6/2004 | Trandal et al. | 379/211.02 |
| 2005/0261034 A1 | * | 11/2005 | Punaganti et al. | 455/567 |

* cited by examiner

Primary Examiner—Thjuan K Addy
(74) Attorney, Agent, or Firm—Cohen Pontani Lieberman & Pavane LLP

(57) ABSTRACT

A call handling system includes a call handling device arranged between a user's phone and a telephone network. The call handling device detects an incoming call to the user's phone and forwards a message to the user including information about the incoming call to a mobile device held by a user over a two-way interface. Furthermore, the call handling device allows the user to send instructions regarding how to handle the call from the mobile device over the two-way interface.

28 Claims, 5 Drawing Sheets

CALL HANDLING USING NON-SPEECH CUES VIA A PERSONAL ASSISTANT

BACKGROUND OF THE INVENTION

1. Field of the Invention

The present invention relates to a call handling device connected to a user telephone for communicating information about an incoming call to a user and allowing the user to transmit call handling instructions to the call handling device.

2. Description of the Related Art

In an office environment, workers typically have stationary phones connected at their desks and also carry mobile phones so that they may be contacted when they are away from their desks. Since many workers do not have administrative assistants to answer their phones, they rely on call forwarding from their desk phones to their mobile phones to ensure that they do not miss important calls. Typically, a worker will program the desk phone to forward calls to the user's mobile or cell phone at least when the worker knows that he or she will be away from the desk for a significant period of time.

Meetings present a challenge to the call forwarding scenario. On one hand, the worker does not want to disturb other participants of the meeting with repeated phone rings. On the other hand, the worker does not want to miss certain "exceptional case" calls such as, for example, a call the worker is waiting on or an emergency call. Accordingly, the worker must balance one factor against the other when deciding whether to forward calls to his cell phone during a meeting.

U.S. Pat. No. 5,742,905 (Pepe) discloses a Personal Communications Internetworking (PCI) network with a CallCommand service for controlling voice calls using a PDA connected to the PCI network. However, the PCI network is connected between a wireline and a wireless network and is not directly connected with any terminal. Accordingly, all messages to each terminal are required to be routed to the remotely located PCI network. This reference also discloses call management of voice calls in which the user is notified by a wireless terminal or PDA of an incoming call. The user may answer the call using the wireless terminal (if the wireless terminal has that capability), screen the call in real time, redirect the call, or send the caller a short-message.

SUMMARY OF THE INVENTION

According to the present invention, a call handling device detects an incoming call to a user's phone, allows two-way communication between a user device and the call handling device, and processes the incoming call in response to instructions received by the two-way communication. After detecting an incoming call, the call handling device sends a message to a mobile device carried by the user using the two-way communication. The user may then input a response to the message using the mobile device and send an instruction to the call handling device for handling the incoming call.

The information forwarded by the call handling device to the mobile device may include caller identification collected through call ID, a Private Branch Exchange Computer/Telephone Interface (PBX CTI), or information received from the caller in response to a request from the call handling device.

The instruction sent by the user from the mobile device to the call handling device may include, for example, answering the call, directing the caller to voice mail, sending the caller a message, transferring the call to a conference room, transferring the call to a cell phone of the user, or transferring the caller to another number.

The call handling device may also be responsive to a location or state or activity of the user, i.e., whether the user is proximate the user's desk phone, occupied, online, away from desk, or available. The state of the user's presence may be manually input by the user or automatically determined by the call handling device.

The call handling device may be a standalone device or may be incorporated in a business telephone system which includes many telephones. Furthermore, the system according to the invention may be a subsystem of a larger system for providing a personal virtual assistant.

The mobile device which is held by the user for communicating with the call handling device may be a Personal Digital Assistant (PDA), Personal Computer (PC), a mobile phone, or an application specific device designed to perform the call handling application. The two-way communication may be a wireless communication such as a Wireless Local Area Network (WLAN) using 802.11b protocol. The mobile device may, for example, communicate with the call handling device using Simple Object Access Protocol (SOAP).

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
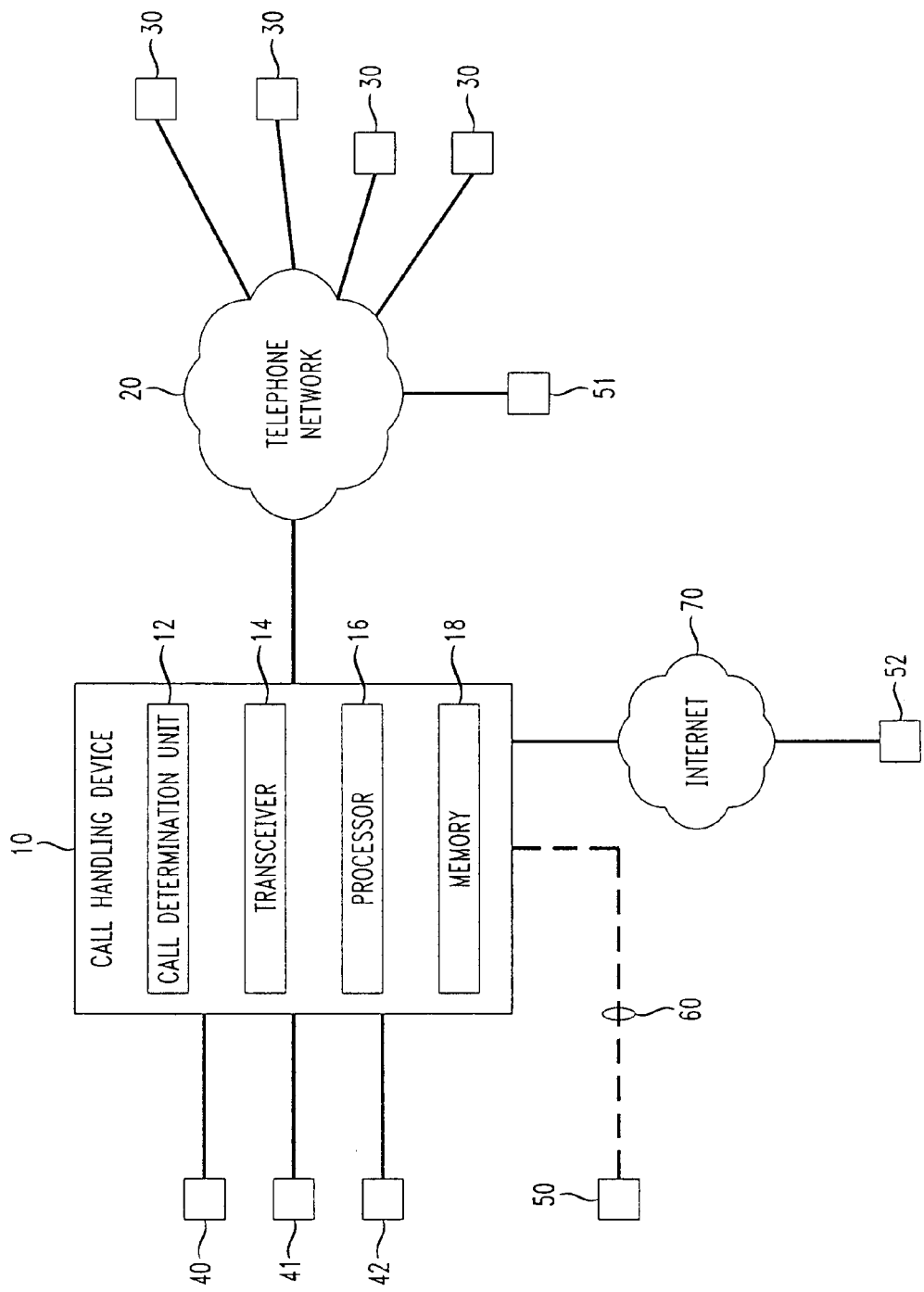
FIG. 1 is a schematic view of a call forwarding system according to the present invention.

FIG. 1 is a schematic diagram showing a call handling device 10 connected to a telephone network 20 which may, for example, be a Public Switched Telephone Network (PSTN). Alternatively, the telephone network could comprise a mobile phone network or a combination of the PSTN and a mobile phone network. The telephone network is also connected to phones 30 which may be wired landline phones or wireless cellular phones. Additional phones 40, 41, 42 are connected to the call handling device 10. Mobile user devices 50, 51, 52 are carried by users associated with respective phones 40, 41, 42. The mobile user device 50 is connected to the call handling device 10 by a communication interface 60, the mobile user device 51 is connected to the call handling device by the telephone network 20, and the mobile user device 52 is connected to the call handling device 10 by the internet 70. Although three phones 40, 41, 42 are shown as connected to the call handling device 10, the call handling device may be designed for as few as one phone or for the capacity of a business phone system.

Figure 5:
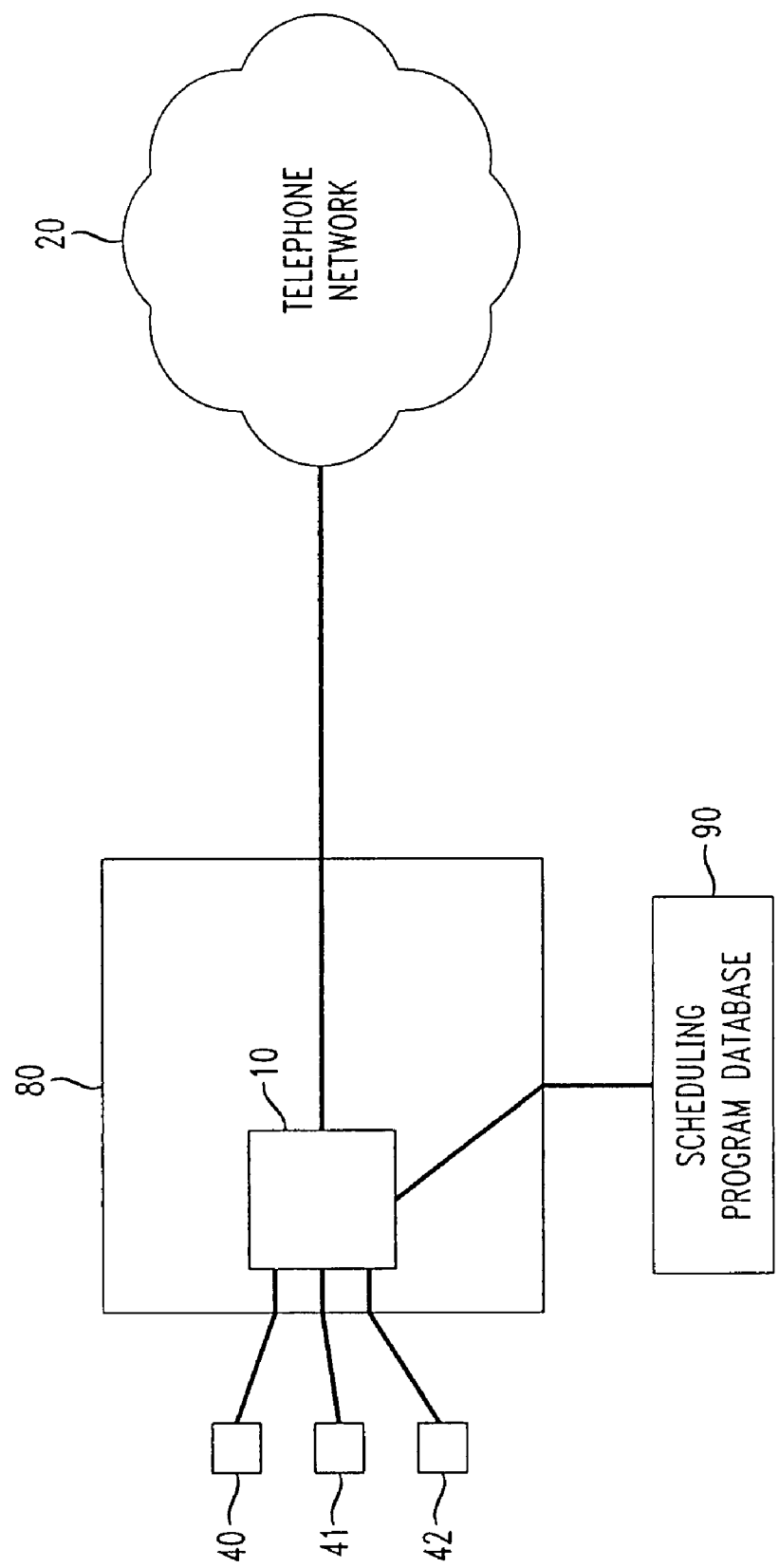
FIG. 5 is a schematic view of a call forwarding system as part of a larger system.

The call handling device 10 includes a processor 16, a call determination unit 12, and a transceiver 14. The call determination unit 12 determines when an incoming call is received for one of the phones 40, 41, 42. The processor 16 determines, based on information in memory 18, whether to ring the telephone 40, 41, or 42 or to send a message to the associated one of the mobile devices 50, 51, 52. The call handling unit 10 is capable of two-way communication with each of the mobile devices 50, 51, 52. The call handling device may be a standalone device as shown in FIG. 1. Alternatively, the call handling device 10 may be a subsystem of a larger system 80, as shown in FIG. 5. Larger system 80 may, for example, be a business telephone system or a personal virtual assistant system.

Mobile user device 50 may include a PDA, PC, a mobile phone, or some application specific device capable of communication with the call handling device 10 by wireless communication interface 60 which may, for example, include a Wireless Local Area Network (WLAN) and use 802.11b protocol and/or Simple Object Access Protocol (SOAP). Alternatively, a Bluetooth or other short range radio transmission could also be used. This configuration is useful for contacting the user when the user is away from his or her primary phone, such as a desk phone, but within the area covered by the WLAN such as in a meeting within the user's office complex. However, if the user is outside of the range of the WLAN such as at a meeting off site, some other communication interface is required. For this purpose, the worker may use the mobile user device 51 which is connected to the call handling device 10 through the telephone network 20. As stated above, the telephone network 20 may include a PSTN, a mobile network, or a combination thereof. Accordingly, the mobile user device 51 may be a cellular phone in communication with the call handling device 10. As an alternative to mobile user device 51, the worker may use the mobile user device 52 which is connected to the call handling device 10 through a wireless connection to the internet 70. The mobile user device 52 may be a cellular phone, a PDA, or other communication device having IP telephony capabilities.

Figure 2:
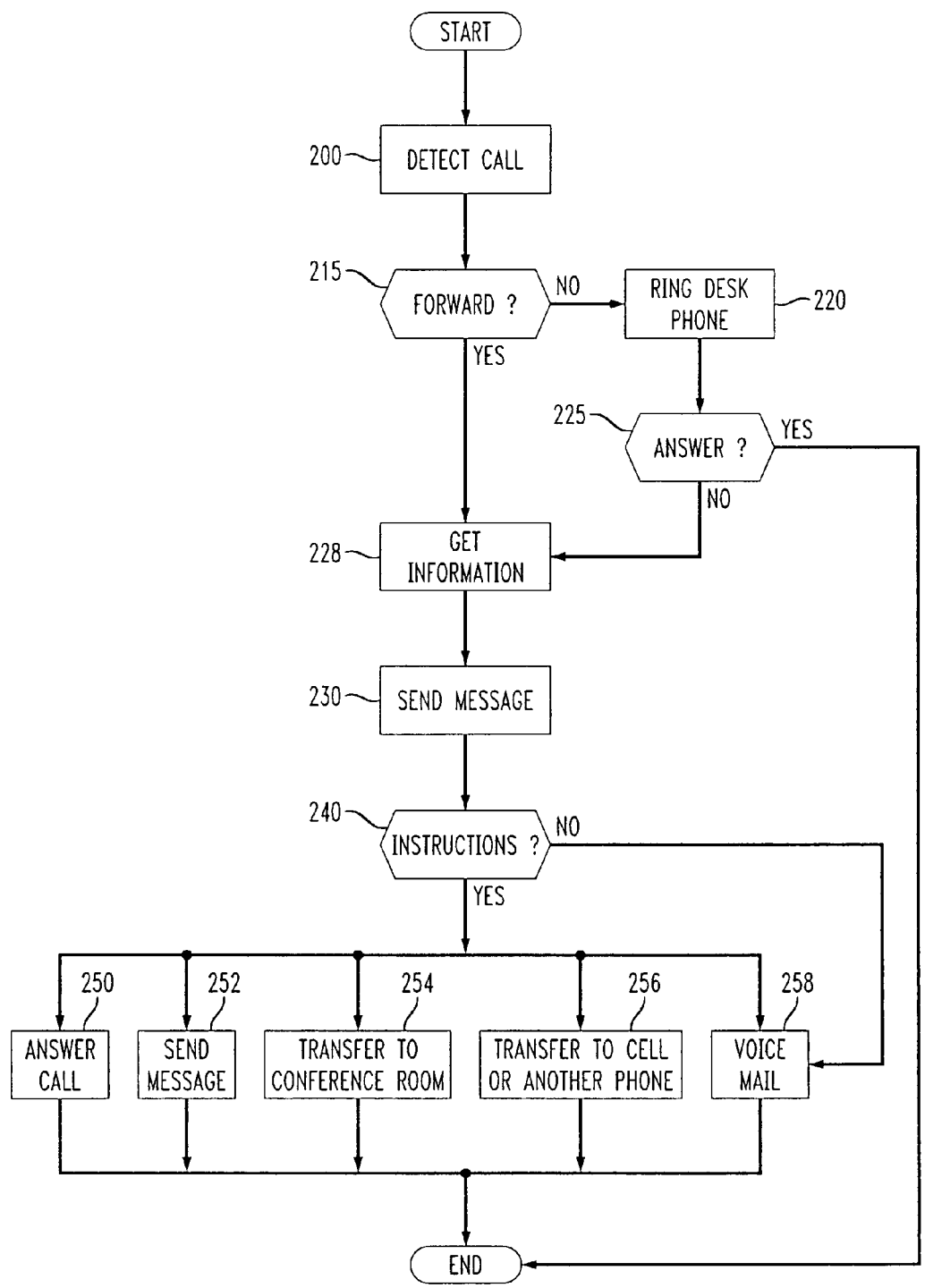
FIG. 2 is a flow diagram showing the steps performed by the call forwarding system of the present invention upon receipt of an incoming call.

A method of using the call handling device 10 according to the present invention is shown in FIG. 2. When a caller uses the phone 30 and attempts to ring a callee's phone 40, the call handling device 10 detects the incoming call, step 200. The call handling device 10 then determines whether to ring the phone 40 or to forward a message to the mobile user device 50 associated with the phone 40, step 215. If it is determined that a message should be sent to the user informing him of the call, the call handling device gathers call information, step 228, and sends the call information to the mobile user device 50, step 230 (Steps 228 and 230 are explained in more detail below). If it is determined that the call should be sent to the phone 40, the call handling device 10 allows the call to go through, step 220. If the phone 40 is answered after step 225, the procedure ends. If the phone 40 is not answered after a predetermined number of rings, the process continues to steps 228 and 230 and the call handling device 10 forwards a message to mobile user device 50 informing the user of the incoming call.

Figure 3:
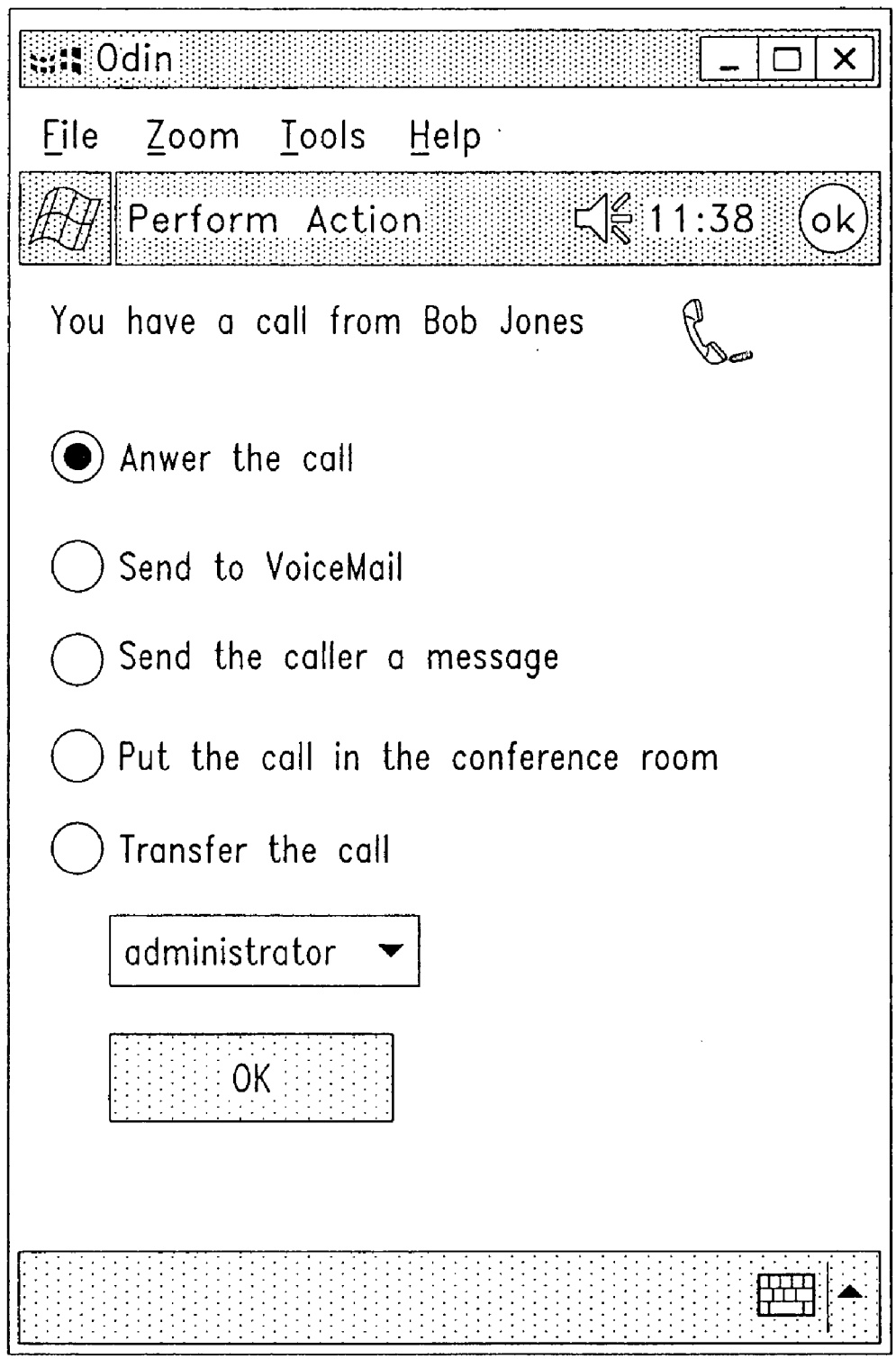
FIG. 3 is a screen image on a user device which is displayed to inform a user of an incoming call.

FIG. 3 is a screen image on mobile user device 50 which is displayed to inform the user of an incoming call. The information forwarded to the mobile user device 50 includes the call information collected in step 228. This information may be collected through call ID, a Private Branch Exchange Computer/Telephone Interface (PBX CTI), or information received from the caller in response to a request from the call handling device 10.

The step 230 of sending the message to the user may also include sending an audio and/or vibration signal to alert the callee user of the incoming call in addition to the visual indication on the screen. Based on the call information, the user may then send an instruction for handling the call back to the call handling device 10 using the mobile user device 50. If the user is non-responsive, the call handling device may process the call according to a pre-established preference selected by the user, such as directing the caller to the voice mail of the callee, step 258.

One of the options shown on the screen of FIG. 3 will allow the user to send an instruction indicating that he will answer the call, step 250. The call handling device 10 will then forward the call to the phone 40 where the user will pick up and answer the call. Alternatively, the user may desire to send a specific stock or pre-stored message to the caller such as, I will call back in 10 minutes, 30 minutes, 1 hour, when I am available, or some other time period, step 252.

Figure 4:
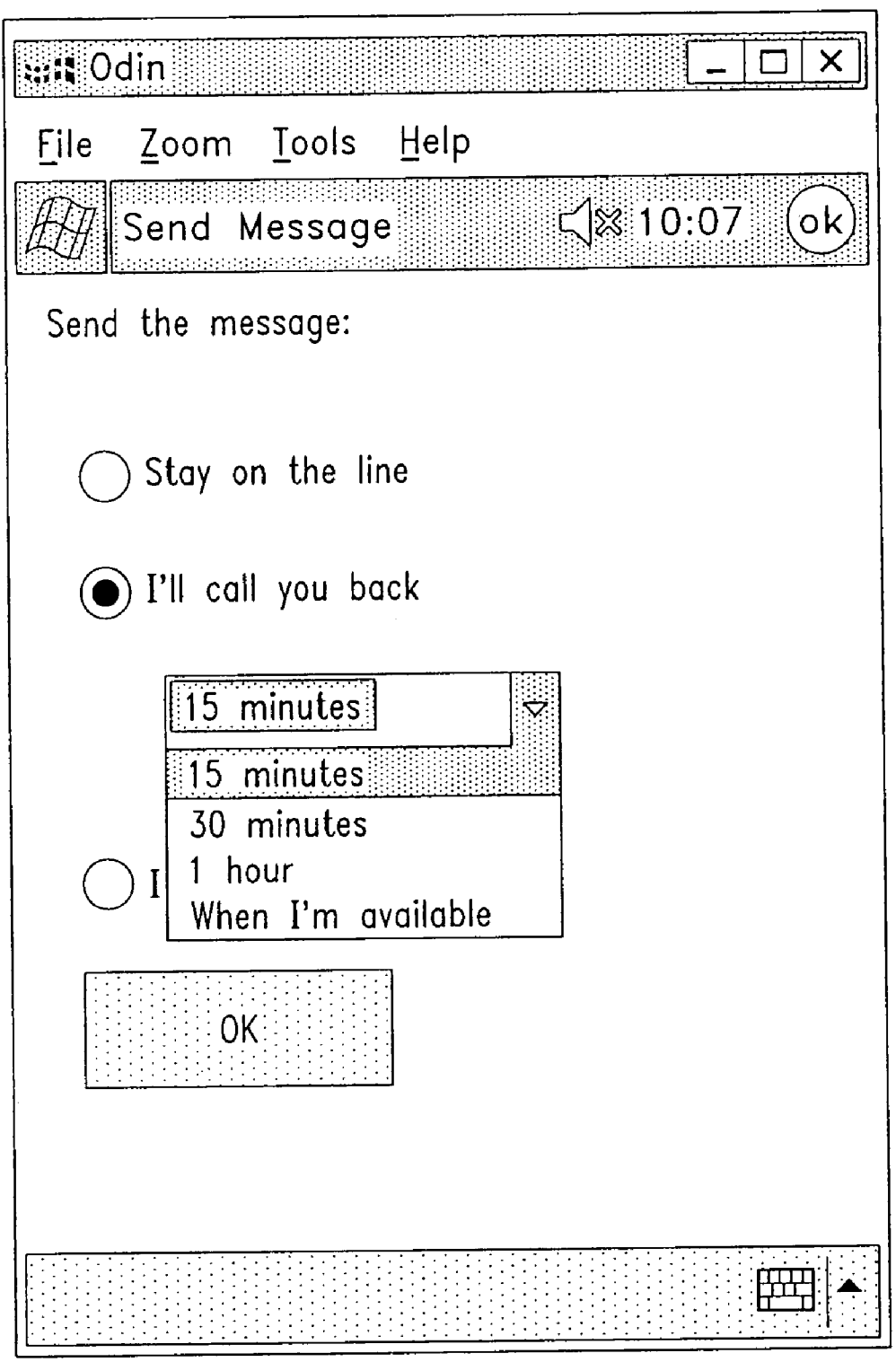
FIG. 4 is a screen image on a user device which is displayed when a user elects to send a message to a caller.

FIG. 4 is a screen image which may be shown on the mobile user device 50 if the user wishes to send the caller a specific message. According to this embodiment, the user selects a specific message to be sent from a list of messages. Alternatively, the user could create a custom message to be sent. In a further alternative, the user may also instruct the call handling device 10 to forward the call to a conference room, step 254, or to the user's cell phone (which, in one embodiment may include the mobile user device 50) or another phone number supplied by the user, step 256. Finally, the user may instruct to the call handling device to send the call to the user's voice mail. Furthermore, the user may wish to send a message in addition to steps 250, 254, 256, and 258. For example, if the user wishes to transfer the caller to a conference room, the user may wish to send a message informing the caller that the transfer is taking place while the caller waits on the line.

The user may, in step 252, send a message requiring an answer from the caller which will help the user determine whether to take the call. For example, the user may want to know, "Is this an emergency?". The particular question to be asked may be selected from stock or pre-stored questions. The caller then answers the question by either voicing the answer or by inputting the answer via an input on the caller's communication device. The message sent to the caller may include instructions for answering the query such as, input "1" for yes or "2" for no.

The call handling device may also include or be connected to a voice recognition device so that the caller's voiced answer is translated into a text message for the user. The voice recognition device may also be used to allow the user to create a custom question to be sent to the user, such as, "Is this call related to the ABC project?". The voice recognition device could translate the text to a custom voiced message to the user.

In step 215, the call handling device 10 may rely on the location, or presence of the user. That is, the decision on whether to forward the call to the mobile user device 50 may be decided relative to where the user is, i.e., whether the user is present in the office. This information, in the form of a presence signal, may be input to the call handling device manually such as through the mobile user device 50 or through the user phone 40, or may be automatically fed to the call handling device 10. For example, the user may inform the call handling device that he will be away from the office for the day. The call handling device will not forward calls to the user's desk phone 40 during that time period. Alternatively or additionally, the call handling device may automatically detect the user's presence such as by detecting whether the user is on the user's telephone or occupying the user's desk chair, etc., or by using a calendar or other type of scheduling program 90 (see FIG. 5). For example, if a user has a meeting scheduled for a certain time period on the calendar, the call handling device 10 interrogates a database of the scheduling program 90 and determines that the user is not present at his desk for the duration of the meeting and will not forward calls to the desk phone during that time period. The feature may also be used to handle calls during vacations. For example, the call handling device may direct all calls to voice mail during a scheduled vacation.

When the user's phone is off hook or the user is busy e.g., in a meeting, etc., the call handling device 10 may handle incoming calls differently depending on who they are from. For example, the user may define a list of important people. The list of important people may include all people in a contacts list or, alternatively, be composed of contacts having a designated field in the contact entry which is used to indicate whether the particular contact is an important person. When a call is received in step 215 and the user is busy or in a meeting, the call handling device 10 first determines whether the caller is identified in the list of important people. If the caller is defined as an important person, a first action is taken such as, notifying the user of the incoming call. If the caller is not identified as an important person, a second action is taken, such as transferring the caller to voice mail.

It should be appreciated that the foregoing description of the operation of the present invention used the mobile user device 50 as an example only, and that the other mobile user devices 51, 52 could have, likewise, been used.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A call handling system, comprising:
   a user terminal;
   a call handling device adapted to establish connection between a user telephone and a telephone network, said call handling device including a transceiver for allowing two-way communication between the user terminal and the call handling device;
   a presence signal identifying a status of the user's present ability to answer an incoming call to the user telephone;
   wherein said call handling device includes a processor and is operative to direct an incoming call intended for placement to the user telephone and to handle the incoming call in response to said presence signal by one of directing the incoming call to the user telephone or sending a first message about the incoming call to the user terminal, the call handling device further operative to send a second message from the user terminal to the caller of the incoming call indicating at least one of how or when the incoming call will be answered by the user; and
   means for allowing a two-way messaging dialogue between said user device and the caller of the incoming call, the two-way messaging dialogue being different from the two-way communication created by answering the incoming call, whereby the user can request and receive information from the caller regarding the nature of the call before answering the call using the two-way messaging dialogue.

2. The call handling device of claim 1, wherein said processor includes a memory for storing said presence signal.

3. The call handling system of claim 1, wherein said user terminal comprises a personal digital assistant.

4. The call handling system of claim 1, wherein said user terminal comprises a mobile phone.

5. The call handling system of claim 1, wherein said processor handles calls in response to said presence signal and in response to instructions received by the two-way communication between the user terminal and the call handling device.

6. The call handling system of claim 5, wherein the two-way communication between the user terminal and the call handling device occurs via a wireless interface.

7. The call handling system of claim 5, wherein the two-way communication between the user terminal and the call handling device occurs via a wireless local area network.

8. The call handling system of claim 5, wherein the two-way communication between the user terminal and the call handling device occurs via the telephone network.

9. The call handling system of claim 5, wherein the two way communication between the user terminal and the call handling device occurs via the internet and uses Internet Protocol telephony.

10. The call handling system of claim 1, wherein the call handling device is a part of a business telephone system.

11. The call handling device of claim 1, wherein the call handling device is a part of a personal virtual assistant system.

12. The call handling system of claim 1, wherein the call handling device includes means for determining an identification of a caller initiating the incoming call and said processor handles the incoming call in response to the identification of the caller.

13. A method for handling incoming telephone calls intended for placement to a user telephone in a telephone system having a call handling device and a mobile user terminal, the call handling device adapted to establish connection between the user telephone and a telephone network, said method comprising the steps of:
   detecting, by the call handling device, an incoming call to the user telephone;
   determining, by the call handling device, whether to direct the incoming call to the user telephone or to forward a first message about the incoming call to the user device;
   if it is determined to forward a first message, then sending, by the call handling device, the first message including call information about the incoming call to the user device over a communication interface;
   allowing a two-way messaging dialogue between the mobile user terminal and the caller, the two-way messaging dialogue being different from the two-way communication created by answering the incoming call, and sending, by the user, a request to the caller for information regarding the nature of the call via the two-way messaging dialogue before answering the call; and
   sending, by the user, a second message from the user device to the caller of the incoming call through the call handling device in response to the first message, the second message indicating at least one of how or when the incoming call will be answered by the user, wherein said step of determining whether to direct the incoming call to the user telephone comprises identifying a presence of the user at the user telephone, the presence indicating the user's present ability to answer an incoming call to the user telephone, and using the identified presence as a factor in determining whether to direct the incoming call to the user telephone.

14. The method of claim 13, wherein said step of sending comprises determining, by said call handling device, the call information.

15. The method of claim 14, wherein said step of determining call information includes determining the call information from caller ID information.

16. The method of claim 14, wherein said step of determining call information includes determining the call information from a private branch exchange computer/telephone interface.

17. The method of claim 14, wherein said step of determining call information includes querying the caller for information using the two-way messaging dialogue and determining the call information from information received in response to the query.

18. The method of claim 13, further comprising the step of receiving, by the call handling device, instruction from the user device wherein said step of handling the incoming call comprises forwarding the call to the user telephone if the user instruction is to answer the call, sending the caller the second message if the user instruction is to send the second message, transferring the call to another telephone if the user instruction is to transfer to another phone, and directing the incoming call to voice mail if the instruction is to take a voice mail message.

19. The method of claim 18, wherein said step of handling the incoming call comprises directing the incoming call to a voice mail if the instruction from the user is a non-reply.

20. The method of claim 13, further comprising the step of determining an identification of the caller of the incoming call and said step of determining whether to direct the incoming call to the user telephone or forward a first message is based on the presence and on the identification of the caller.

21. The method of claim 13, wherein said step of sending a first message comprises the step of sending a further message to the caller, the further message indicating to the caller that the called party associated with the user telephone is being located.

22. The method of claim 13, wherein the second message to the caller informs the caller how the call is being handled during said step of handling.

23. The method of claim 13, wherein the step of identifying the presence of the user relative to the user telephone is performed in response to instructions input by the user to the call handling device using one of the user telephone and the mobile user terminal.

24. The method of claim 13, wherein the step of identifying the presence of the user relative to the user telephone includes the step of interrogating, by the call handling device, a scheduling program database of the user.

25. The call handling device of claim 1, wherein the second message is selected by the user from a list of stock messages stored in the call handling device.

26. The method of claim 13, wherein the second message is selected by the user from a list of stock messages stored in the call handling device.

27. The call handling device of claim 1, wherein the means for allowing the two-way messaging dialogue includes or is connected to a voice recognition device configured to translate a user's text message to a voiced message for the caller and to translate the caller's voiced answer into a text message answer for the user.

28. The method of claim 13, wherein the request from the user is a text message request and the step of sending a request to the caller via the two-way messaging dialogue includes translating the text message request to a voiced message to the caller and translating a caller's voiced answer into a text message answer for the user.

* * * * *